Feb. 3, 1959　　　　　J. E. COOPER　　　　　2,871,722
ADAPTER MEANS FOR DENTAL MOTOR CONTROLS
Filed Jan. 8, 1957

INVENTOR.
JOHN E. COOPER
BY
ATTORNEY nited States Patent Office
2,871,722
Patented Feb. 3, 1959

2,871,722
ADAPTER MEANS FOR DENTAL MOTOR CONTROLS

John Edmond Cooper, Los Angeles, Calif.

Application January 8, 1957, Serial No. 633,130

3 Claims. (Cl. 74—562)

This invention relates to adapter means for dental motor controls whereby such motor controls can be converted to facilitate their use by dentists while seated on the dental stool.

In my Patent No. 2,620,863, issued December 9, 1952, I show a dental stool with a foot rest and motor control support which are rigidly attached to the base of the stool. In my later Patent No. 2,712,348, issued July 5, 1955, I show a dental stool having a rotatable motor control support.

My present invention is adapted to be used with a dental stool of the type shown and described in such prior patents, with the construction of the latter patent being illustrated in the drawings herein merely for the purpose of exemplifying the use of my invention. It should be understood, however, that my adapter means are adapted to be used in connection with any type or construction of dental stool.

At the present time, a conventional motor control is operated by the engagement of the dentist's foot with either of a pair of rotatable lever arms which are disposed around the periphery of the circular motor control. It is an object of my invention to provide adapter means for permitting operation of the motor control by a sideward sliding movement of the foot while the foot is rested upon the top of the motor control. Such sliding movement is desirable particularly if the dentist is in a seated position, it being difficult to operate the motor control in the conventional manner from such a position. My invention is also capable of use while the dentist is in a standing position, offering easier and more restful operation of the motor control.

It is accordingly an object of my invention to provide adapter means having all of the benefits and advantages of the structure set forth above.

It is among the further objects of my invention to provide such adapter means which are extremely simple and economical to manufacture and use and which will not interfere with, but will in fact facilitate, the operation of the motor control.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of a dental stool having a motor control support, with a motor control utilizing my invention mounted thereon;

Figure 1:
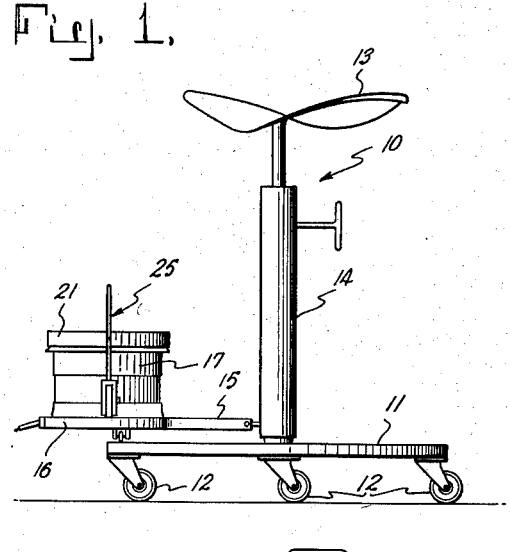
Figure 2:
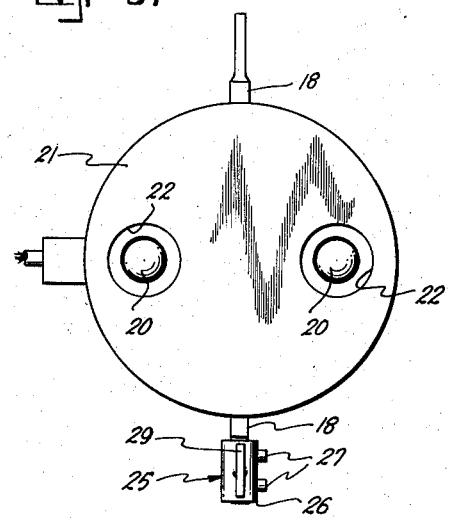
Fig. 2 is a top plan view of a dental motor control with my adapter means mounted thereon.
Figure 3:
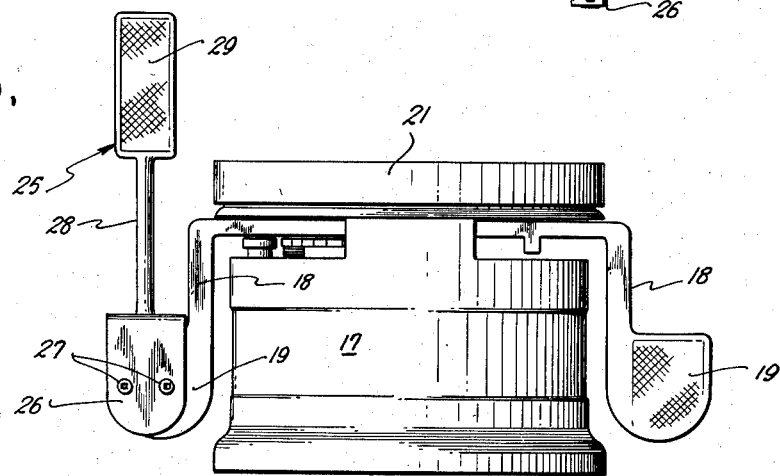
Fig. 3 is a side elevational view of the same.
Figure 4:
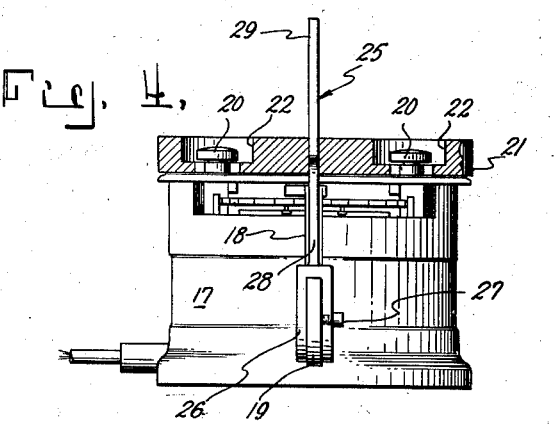
Fig. 4 is a side elevational view taken at a ninety degree angle from Fig. 3, with some parts broken away for purposes of illustration.

A preferred embodiment which has been selected to illustrate my invention comprises a dental stool 10 having a circular foot support 11, which is mounted on casters 12. A pommel seat 13 is mounted on the upper end of a vertical shaft 14. A motor control support 15 is pivotally attached to the shaft 14 and has an outer circular portion 16 which is adapted to receive and hold a conventional motor control unit 17.

The motor control 17 is circular in cross-section and is operated by a pair of downwardly directed lever arms 18, which are disposed on opposite sides of the motor control 17. The outer extremities of the arms 18 are provided with outwardly directed pedals 19, which are adapted to be engaged by the feet to cause the lever arms 18 to move in a circular path around the motor control unit 17. Such movement of the lever arms 18 controls the amount of electricity which is supplied to the dental motor and thus controls the operation of the electric drill.

The top of the motor control unit 17 is provided with a pair of upwardly directed control knobs 20. These knobs are manually movable between upper and lower positions in which they control the operation of the motor control unit 17.

It will thus be seen that the operation of the motor control unit 17 by a dentist seated on the seat 13 is quite difficult. It will also be seen that the dentist cannot rest his foot upon the top of the motor control unit 17 without possibly affecting the setting of the knobs 20 and thus interfering with the proper operation of the motor unit 17.

My invention comprises two-part adapter means which cooperate to overcome these disadvantages and to provide for easy and sure control of the motor control unit 17 from a seated position or even from a standing position, with the foot of the dentist being disposed on top of the motor control unit 17.

One part of my adapter means comprises a circular top plate 21 which is adapted to be removably mounted on the top of the motor control unit 17. The top plate 21 may be formed of wood, metal, plastic or other suitable hard and durable material. The diameter of the top plate 21 is preferably substantially equal to that of the motor control unit 17 and its thickness is preferably greater than the maximum height of the knobs 20 above the top of the motor control unit 17 when the knobs 20 are in their upper position. The upper surface of the top plate 21 will thus be disposed above the top of the knobs 20 at all times, even when the knobs 20 are in their upper positions.

The top plate 21 is provided with a pair of circular openings 22, which are so arranged that they will fit over the control knobs 20. In the embodiment shown in the drawings, the openings 22 are disposed adjacent the periphery of the top plate 21 and on a diametric line with each other.

Each of the openings 22 is counter-sunk to provide a wider opening at the top thereof, thereby permitting the dentist to reach into the openings 22 and grasp the knobs 20 to move them to a different position.

When my top plate 21 is in position on the top of the motor control unit 17, the dentist's foot may be rested upon it without adversely affecting or interfering with the setting of the control knobs 20.

The other part of my adapter means comprises a control extension member 25, which is adapted to be removably attached to either of the pedals 19 of the lever arms 18. The extension member 25 comprises a yoke shaped base member 26, which is adapted to slidably fit around the pedal 19 from the top thereof. The base member 26 is provided with a pair of screws 27 or other suitable fastening members, which extend therethrough and which are adapted to engage the pedal 19 to hold the extension member 25 firmly in place thereon.

The extension member 25 includes an extension arm 28, which extends upwardly from the base member 26 when the latter is in position on the pedal 19. Above the extension arm 28 is a foot member 29, the lower edge of which is preferably substantially aligned with the top of the top plate 21, so that the foot member 29 extends a substantial distance above the upper surface of the top plate 21 when my adapter means are in use. The base member 26, extension arm 28 and foot member 29 may be formed integrally, as shown in the drawings.

In use, the dentist rests one foot upon the upper surface of the top plate 21 in such a position that his foot protrudes beyond the periphery of the top plate 21 and is disposed adjacent to the foot member 29. By a simple sideward sliding movement of the foot, which may be only a pivoting of the foot from the ankle, the dentist's foot engages the foot member 29 and through the extension member 25 causes the lever arm 18 to move.

It will be noted that my adapter means do not interfere with the functioning of the motor control unit 17 and that they may be easily attached thereto and removed therefrom.

I claim:

1. Adapter means for a dental motor control of the type having a circular cross section, with one or more lever arms with foot control pedals adjacent the bottom of said motor control, and a pair of control knobs directed upwardly from the top of said motor control, said control knobs being movable between upper and lower positions, said adapter means comprising a circular top plate removably mounted on the top of said motor control, the diameter of said top plate being substantially equal to that of said motor control, said top plate having a pair of openings therein, said openings being arranged so as to fit around said control knobs, the top of said top plate being disposed above the upper portions of said knobs, each of said openings being counter-sunk to permit manual access to and movement of said control knobs between their upper and lower positions, the top of said plate having a completely flat horizontal upper surface so that the foot of the dentist can rest upon and move freely across said surface, a vertically directed extension member removably attached to the pedal of one of said lever arms, said extension member having a yoke-shaped base member slidably fitting around said pedal from the top thereof, an extension arm extending upwardly from said base member and a foot member extending upwardly from said extension arm, said foot member comprising a vertically directed flat plate disposed above the upper surface of said top plate adjacent the periphery thereof, said top plate and extension member permitting the dentist to rest and slidably move his foot upon the flat upper surface of said top plate and operate said motor control by sliding sideward movement of his foot with said foot member, causing simultaneous rotary movement of the foot control pedal of said motor control.

2. The structure set forth in claim 1, said yoke-shaped base member carrying horizontally directed manually operable fastening means adapted to engage the side of the pedal of said motor control to hold said extension member in position thereon.

3. Adapter means for a dental motor control of the type having a circular cross section, one or more lever arms with foot control pedals adjacent the bottom of said motor control, and a pair of control knobs directed upwardly from the top of said motor control, said adapter means comprising a circular top plate removably mounted on the top of said motor control, the diameter of said top plate being substantially equal to that of said motor control, said top plate having a pair of openings therein, said openings being arranged so as to fit around said control knobs, the top of said top plate being disposed above the upper portions of said knobs, the top of said plate having a completely flat horizontal upper surface so that the foot of the dentist can rest upon and move freely across said upper surface, a vertically directed extension member attached to the pedal of one of said lever arms, said extension member extending vertically upwardly from said pedal and having a foot member comprising a vertically directed member disposed above the upper surface of said top plate adjacent the periphery thereof, said top plate and extension member permititng the dentist to rest and slidably move his foot upon the flat upper surface of said top plate and operate said motor control by sliding sideward movement of his foot with said foot member, causing simultaneous rotary movement of the foot control pedal of said motor control.

References Cited in the file of this patent
UNITED STATES PATENTS

| 1,763,995 | Weber | June 17, 1930 |
| 2,200,621 | Hilley | May 14, 1940 |
| 2,762,891 | Hill et al. | Sept. 11, 1956 |